Patented July 15, 1930

1,770,714

UNITED STATES PATENT OFFICE

OSKAR SPENGLER, OF BERLIN-NEUBABELSBERG, AND WERNER MÜLLER, OF LIEPZIG, GERMANY, ASSIGNORS, BY MESNE ASSIGNMENTS, TO GENERAL ANILINE WORKS, INC., OF NEW YORK, N. Y., A CORPORATION OF DELAWARE

PROCESS FOR DYEING CELLULOSE-ACETATE THREADS

No Drawing. Application filed August 14, 1926, Serial No. 162,199, and in Germany August 15, 1925.

The present invention relates to the unsulfonated azo dyestuffs of the general formula:

$$HO.CH_2.CH_2.O.R.N=N.X$$

wherein R represents a radicle of the benzene series which may be further substituted and X the radicle of an aromatic azo component. Our invention relates furthermore to the cellulose acetate threads dyed with our new dyestuffs and to a process for dyeing cellulose acetate threads by means of our new dyestuffs.

We have found that the unsulfonated azo dyestuffs of the above given general formula are extraordinarily adapted for the dyeing of cellulose acetate threads from an aqueous medium. The dyeings thus produced are very strong and fast, while the corresponding dyes derived from diazotized amino-compounds or amino-ethoxy-compounds are not adapted for dyeing cellulose-acetate threads. Our new dyestuffs may be obtained by combining a β-hydroxy-ethoxy-diazo compound of the benzene series with any suitable aromatic azo component.

The following examples serve to illustrate our invention without limiting it thereto:

*Example 1.*—The dye made from 1-β-hydroxyethoxy-4-diazobenzene and aceto-acetic acid anilid having the probable formula:

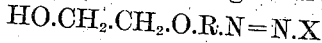

is well ground with the same quantity of soap and Turkey red oil. Cellulose acetate silk is dyed at 60–70° C. in an aqueous suspension of this mixture, a clear greenish yellow being obtained. In the same manner the dye made from 1-β-hydroxyethoxy-4-dyazobenzene and 1 - amino - 7 - hydroxynapthalene produces a dark claret dyeing. The dye made from 1 - β - hydroxyethoxy - 4 - diazobenzene and 2 - amino - 7 - hydroxynaphthalene dyes cellulose acetate silk brownish red-orange; the dye made from 1-β-hydroxyethoxy-2-diazobenzene and 2 - hydroxynaphthalene gives very clear intensive red shades.

*Example 2.*—The dye made from 1-β-hydroxyethoxy-2-diazobenzene and 1-hydroxybenzene-2-carboxylic acid is dissolved in hot water and in this solution cellulose acetate silk is dyed at 60–70° C. Some sodium sulphate may be added. Strong yellow tints are obtained.

*Example 3.*—The dye made from 1-β-hydroxyethoxy - 2 - chloro - 4 - diazobenzene and 1 - phenyl - 3 - methyl-5-pyrazolone is well ground with equal quantities of soap solution 1:10 and Turkey red oil. Cellulose acetate silk is dyed at 60–70° C. a strong clear yellow dyeing being obtained.

In the same way the dye made from 1-β-hydroxyethoxy - 4 - nitro - 2 - diazobenzene and 1,3-dioxybenzene dyes cellulose acetate silk yellow.

What we claim is:

1. In a process for dyeing cellulose acetate threads the step which consists in applying to the material in an aqueous medium an unsulfonated azo dyestuff of the general formula: $HO.CH_2.CH_2.O.R.N=N.X$, wherein R represents a radicle of the benzene series, which may be further substituted and X represents the radicle of an aromatic azo component.

2. In a process for dyeing cellulose acetate threads the step which consists in applying to the material in an aqueous medium an unsulfonated azo dyestuff of the general formula: $HO.CH_2.CH_2.O.R.N=N.X$, wherein R represents a radicle of the benzene series which may be substituted by a halogen or a nitro group and X represents an aromatic nucleus of the benzene or naphthalene series, which may be substituted or not.

3. In a process for dyeing cellulose acetate threads the step which consists in applying to the material in an aqueous medium the unsulfonated azo dyestuff of the probable formula:

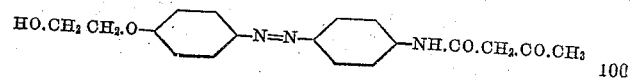

4. As new products the unsulfonated azo dyestuffs of the general formula:

HO.CH₂CH₂.O.R.N.=N.X wherein R represents a radicle of the benzene series, which may be further substituted, and X represents the radicle of an aromatic azo component.

5. As new products the unsulfonated azo dyestuffs of the general formula:

HO.CH₂CH₂.O.R.N=N.X wherein R represents a radicle of the benzene series which may be substituted by a halogen or a nitro group and X represents an aromatic nucleus of the benzene or naphthalene series, which may be substituted or not.

6. As a new product the azo dyestuff of the probable formula:

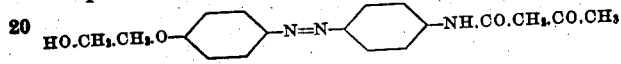

which dyes cellulose acetate silk clear greenish yellow shades.

7. Cellulose acetate silk dyed with the dyestuffs described in claim 4.

8. Cellulose acetate silk dyed with the dyestuffs described in claim 5.

9. Cellulose acetate silk dyed with the dyestuff described in claim 6.

In testimony whereof we affix our signatures.

OSKAR SPENGLER.
WERNER MÜLLER.